No. 857,131.
R. S. WELLS.
DRIVE MECHANISM FOR DISTRIBUTING WAGONS.
APPLICATION FILED DEC. 15, 1906.
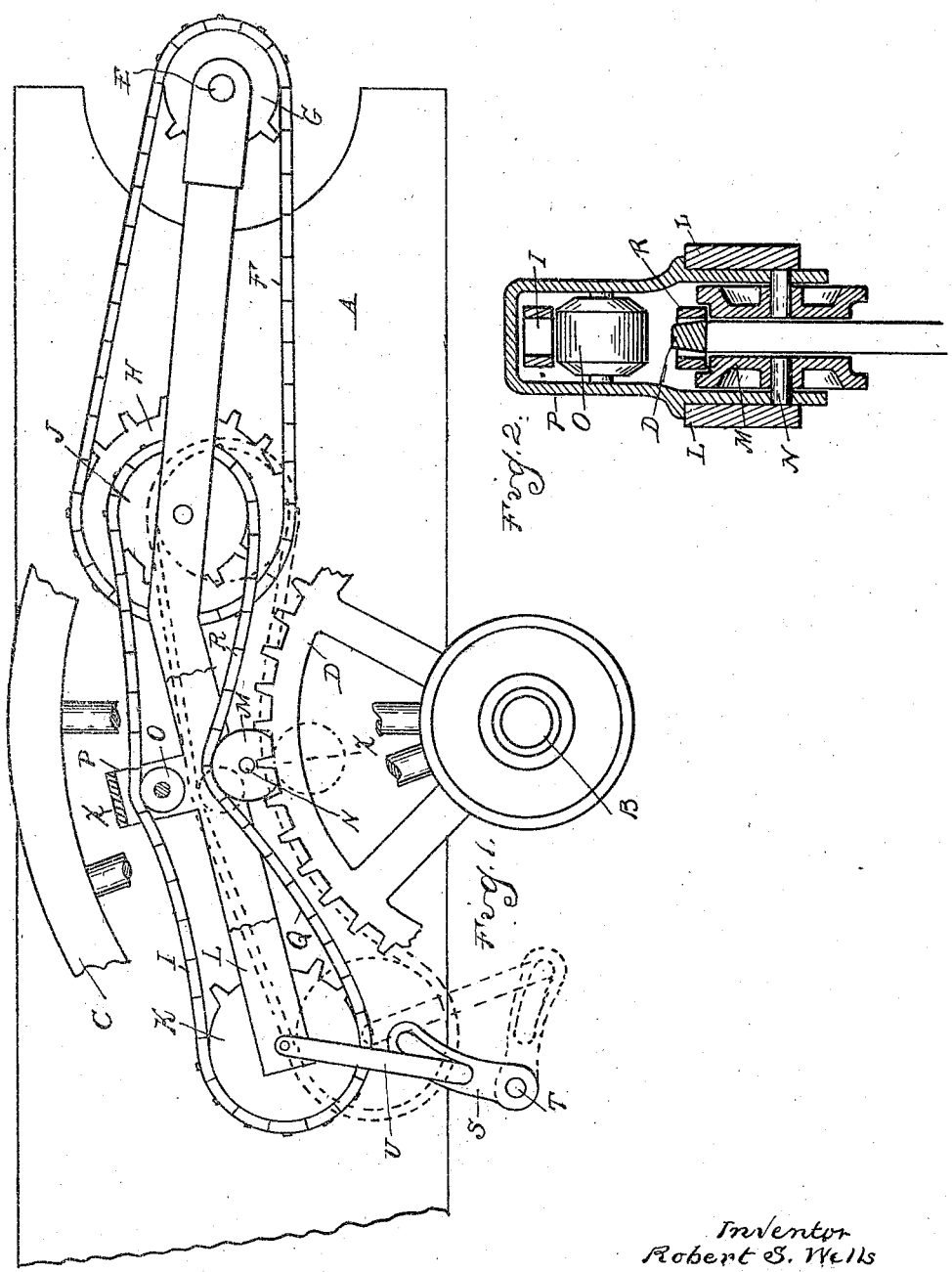
Inventor
Robert S. Wells
Witnesses

UNITED STATES PATENT OFFICE.

ROBERT S. WELLS, OF DETROIT, MICHIGAN, ASSIGNOR TO AMERICAN HARROW COMPANY, OF DETROIT, MICHIGAN, A CORPORATION OF MICHIGAN.

DRIVE MECHANISM FOR DISTRIBUTING-WAGONS.

No. 857,131.      Specification of Letters Patent.      Patented June 18, 1907.

Application filed December 15, 1906. Serial No. 348,003.

*To all whom it may concern:*

Be it known that I, ROBERT S. WELLS, a citizen of the United States of America, residing at Detroit, in the county of Wayne and State of Michigan, have invented certain new and useful Improvements in Drive Mechanism for Distributing - Wagons, of which the following is a specification, reference being had therein to the accompanying drawings.

The invention relates to the construction of distributing wagons, more particularly designed for use in the distribution or spreading of manure over a field to be fertilized.

The invention consists in the means employed for driving the distributing mechanism, as hereinafter set forth.

In the drawings, Figure 1 is a side elevation of a portion of a distributing wagon showing the ground wheels and drive mechanism; and Fig. 2 is a cross section on line *x—x*, Fig. 1.

With wagons of the type above described, it is usual to provide a toothed distributing wheel at the rear end of the wagon, and also means for feeding the contents of the wagon rearwardly into operative proximity to said distributing wheel, this mechanism being driven from one of the ground wheels. On the other hand, when the wagon is used merely to transport the load, the distributing mechanism is out of action.

It is the particular object of the present invention to attain a simple construction of drive connection between the ground wheels and the distributing mechanism, and one which may be easily thrown into or out of action by a slight movement. This object is attained by the construction as follows:

A is a side of the distributing wagon, B the rear axle, and C the rear ground wheel journaled thereon.

D is a sprocket suitably connected to be driven from the ground wheel C, and E is the shaft of the distributing wheel (not shown), which is located at the rear end of the wagon body.

The connection between the sprocket wheel D and the shaft E is formed by a sprocket chain, and to secure the required speed of the shaft E two chains are preferably employed in connection with intermediate step-up sprockets. One of these sprocket chains F extends from a sprocket wheel G upon the shaft E to a larger sprocket H, and the other chain I extends from a sprocket J connected to rotate with the sprocket H to a sprocket K. The sprockets H, J, and K are journaled in a frame comprising a pair of separated frame bars L, which, at their rear ends, are pivoted upon the shaft E. The position of the sprockets J and K is such that the chain I extends across a segment of the annular sprocket D and in one position of adjustment of said frame is in engagement with said sprocket.

In order to produce an effective driving engagement, and to distribute the stress to a number of teeth of the sprocket wheel, it is desirable that the chain I should wrap about a segment of the sprocket. On the other hand, it is equally desirable that the engagement and the disengagement of the chain should be effected with as little movement as possible to the frame L. I have therefore devised a construction in which the chain I, when out of engagement with the sprocket is held with portions of its lower half in angular relation to each other. This permits of moving the chain into or out of engagement with the sprocket teeth by comparatively slight movement, whereas if the whole lower portion of the chain were unsupported between the sprockets a relatively large movement would be necessary.

In the construction as shown, the chain I is supported intermediate the sprockets J and K by the rollers M, which are journaled upon stub shafts N on the frame L and are separated from each other a sufficient distance to pass upon opposite sides of the sprocket D, when the frame L is lowered. The upper section of the chain I is also preferably supported by an intermediate roll O, which is journaled in an upwardly extending bracket P on the frame L. Thus, in the normal position of the parts, as illustrated in Fig. 1, the chain I is held with the portions Q and R thereof on opposite sides of the rolls M at a considerable angle to each other, and slightly spaced from the adjacent portions of the sprocket D. The movement of the frame L is effected by suitable connections, such as the crank arm S on the rock shaft T, and the link U connecting said arm to the frame L.

What I claim as my invention is:

1. In a wagon, the combination with the ground wheel, and a shaft to be driven, of a rockable frame, sprocket wheels carried by said frame, a sprocket chain extending about said sprocket wheels and connected to drive said shaft, a sprocket wheel connected to be driven by said ground wheel, means for holding said sprocket chain with portions thereof in angular relation to each other and in proximity to separated points in the periphery of said sprocket wheel connected to said ground wheel, and means for moving said frame to engage or disengage said chain portions with the teeth of the sprocket.

2. A drive mechanism for distributing wagons comprising a ground wheel sprocket, a sprocket chain arranged in the plane of said ground wheel sprocket, means for supporting said sprocket chain with portions thereof in angular relation to each other and respectively adjacent to different portions of the ground wheel sprocket, and means for adjusting said chain supporting means to engage or disengage said portions thereof from the sprocket.

3. In a drive mechanism for distributing wagons, the combination with the ground wheel, of a sprocket driven thereby a driven shaft, a frame pivoted on said shaft and extending in the plane of said sprocket wheel, a sprocket chain connected to drive said driven shaft and carried by said frame, means for supporting sections of said chain in angular relation to each other and adjacent to separated points in the periphery of said sprocket wheel, and means for adjusting said frame to engage or disengage said chain and sprocket.

4. In a drive mechanism for distributing wagons, the combination with a drive sprocket, of a frame rockable in the plane of said sprocket, sprocket wheels journaled in said frame, a sprocket chain extending about said wheels across a segment of said drive sprocket, and a support on said frame for said chain intermediate said sprockets for holding portions of the chain in angular relation to each other, for the purpose described.

5. In a drive mechanism for distributing wagons comprising a drive sprocket, a sprocket chain, sprockets about which said chain passes on opposite sides of said drive sprocket, an adjustable frame on which said chain sprockets are carried and an idler roll for supporting said chain intermediate said sprockets whereby portions of the chain are held in angular relation to each other.

6. A drive mechanism for distributing wagons comprising a drive sprocket, a sprocket chain in the plane thereof, sprockets about which said chain passes on opposite sides of said drive sprocket, an adjustable frame having separated sides for embracing said drive sprocket and carrying said chain sprockets and roller supports on said frame separated to pass on opposite sides of said drive sprocket and holding said chain with portions thereof in angular relation to each other.

In testimony whereof I affix my signature in presence of two witnesses.

ROBERT S. WELLS.

Witnesses:
AMELIA WILLIAMS,
NELLIE KINSELLA.